United States Patent

[11] 3,630,339

| [72] | Inventor | Johannes Bernardus Van der Winden<br>Amstelveen, Netherlands |
|---|---|---|
| [21] | Appl. No. | 24,996 |
| [22] | Filed | Apr. 2, 1970 |
| [45] | Patented | Dec. 28, 1971 |
| [73] | Assignee | Stork Amsterdam N.V.<br>Amstelveen, Netherlands |

[54] CONVEYOR WITH SUSPENDED RECEPTACLES
5 Claims, 4 Drawing Figs.

[52] U.S. Cl. ..................................... 198/145, 206/65
[51] Int. Cl. ............................................ B65g 17/16
[50] Field of Search .......................................... 198/145, 146, 147; 220/21, 29, 31, 36, 38; 206/65 E

[56] References Cited
UNITED STATES PATENTS

| 3,143,120 | 8/1964 | Unthank | 198/145 X |
| 3,107,026 | 10/1963 | De Chelbor | 220/21 |

Primary Examiner—Evon C. Blunk
Assistant Examiner—Hadd S. Lane
Attorney—Waters, Roditi, Schwartz & Nissen ABSTRACT: A conveyor for a treatment apparatus such as a hydrostatic cooker, said conveyor carrying swingably suspended receptacles for bottles, jars or the like containers. In order to keep the containers immovably in the receptacles, the latter have confining means consisting of at least one tiltable covering lath on top of the receptacle and vertical partitions within the receptacle, said partitions being positioned according to a specific configuration.

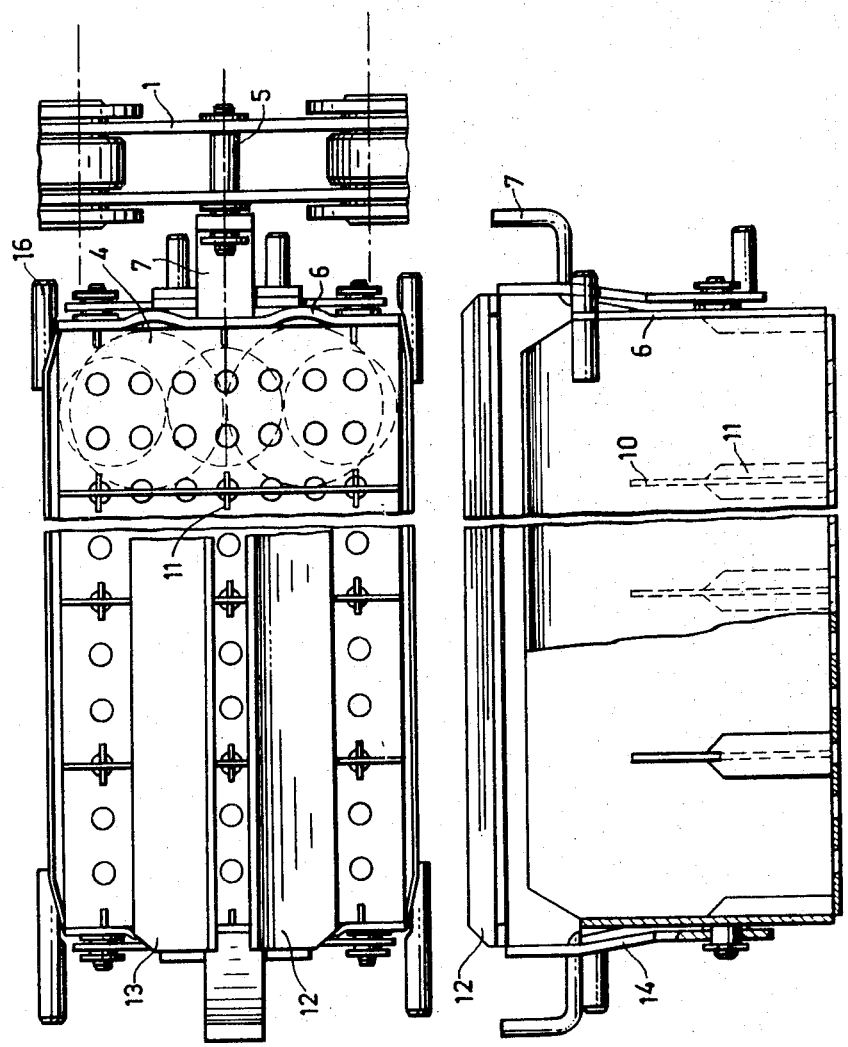

CONVEYOR WITH SUSPENDED RECEPTACLES

BRIEF SURVEY OF THE PRIOR ART

The invention relates to a conveyor consisting of a chain and a row of receptacles which are swingably suspended from the links of the chain and which each can contain a number of containers, like bottles or jars. Such a conveyor is known from the Netherlands Pat. No. 31952, disclosing a continuous sterilizer or hydrostatic cooker, in which the conveyor with the receptacles travel through different spaces filled with either water or steam.

OBJECTS OF THE INVENTION

Sometimes the requirement is imposed that the containers placed in the receptacles should be kept as quiet as possible during their travel through the treatment spaces, e.g., in order to avoid that the contents of the containers comes into contact with the cover.

It is a first object of the invention to provide a conveyor in which this condition is satisfied.

Another object of the invention is to provide confining means for the containers in order to prevent upward and sideward movement within the receptacle.

According to a further feature of the invention the up and down movements of the containers are prevented without hampering the loading and unloading of the receptacles.

SUMMARY OF THE DRAWING

FIG. 3 is a plan view of a receptacle according to FIG. 2

FIG. 4 is a side elevation of a receptacle according to FIG. 2.

DESCRIPTION OF A PREFERRED EMBODIMENT

Figure 1:
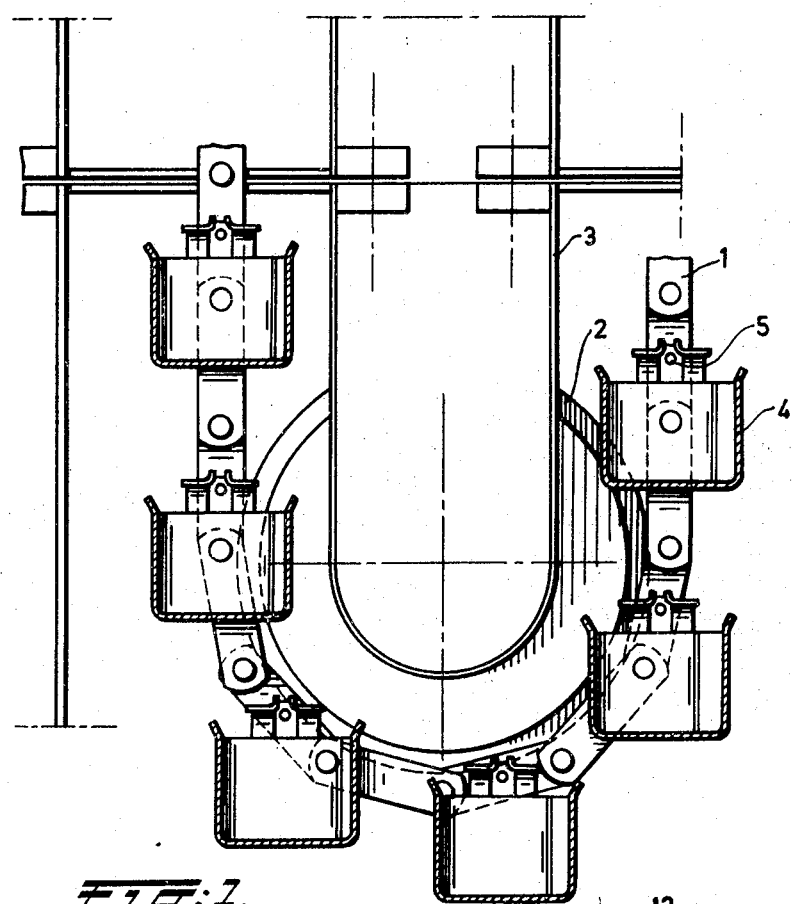
FIG. 1 represents in outline a part of a conveyor according to the invention.

The conveyor consists of a chain 1 which in various loops can be advanced upwards and downwards through a treatment space. In FIG. 1 a part of the chain 1 is represented which is guided around a lower sprocket wheel 2. The treatment space is delimited by a wall 3.

On the chain 1 a row of receptacles 4 is swingably suspended by pivots 5 which are provided on either side of the vertical transverse walls 6 of the receptacle 4 in Z-shaped plates 7, the latter being secured against the transverse walls 6.

Each receptacle 4 consists of a perforated bottom 9 and longitudinal walls 8 in one piece therewith which at their ends are connected by the vertical transverse walls 6. Parallel to the transverse walls 6 a row of vertical equidistantly spaced transverse partitions 10 are provided in the receptacle. A number of steel strips 11 is mounted on these transverse partitions 10 in three parallel vertical planes which are also parallel to the longitudinal walls 8 of the receptacle 4. The central vertical plane coincides with the central longitudinal plane of the receptacle 4, while the distance of the other two parallel planes to the central plane is 2½ times as much as the distance of these parallel planes to the adjacent longitudinal walls 8. The distance between the lateral edges of consecutive steel strips 11 in the same plane is equal to the distance between the just-mentioned parallel planes. As contemplated in plan view the lateral edges of the steel strips 11 are situated about in the corners of a square.

With the indicated arrangement of the steel strips 11 it becomes possible to place in each compartment between two consecutive transverse partitions either three small or two large bottles or jars, see the circumference indicated by dash lines in FIG. 3. Both the three small and the two large bottles or jars are practically situated against each other and against the walls of the receptacle, and/or against the lateral edges of the steel strips 11, so that they are always held in position in such a way that they cannot slide sidewise.

If the receptacle is destined to accommodate other kind of bottles or jars the vertical confining members 11 may be arranged in a different way. Preferably they are, however, always arranged in such a manner that the receptacle is suitable for alternately accommodating containers of different dimensions, while nevertheless the containers of all dimensions are held in position so as to be sidewise immobile.

In order to prevent the containers from moving up and down in the troughs two covering laths 12, 13 are provided over each receptacle 4 in the longitudinal direction thereof, these laths having a L-section in this case. Other profiles may also be used for the covering laths, same should, however, always have a horizontal leg which can extend above the containers in the receptacle.

In the represented embodiment each covering lath 12 or 13 is pivotally connected with the transverse walls 6 of the receptacle 4 by connecting plates 14, the main plane of which is parallel to the plane of the transverse wall 6. The connecting plate 14 is L-shaped, the upright leg of the L supporting the covering lath 12 or 13, whereas the horizontal leg of the L extends in the direction of the longitudinal wall 8 of the receptacle 4 and is connected to the transverse wall 6 near the longitudinal wall 8 by a pivot 15.

Figure 2:
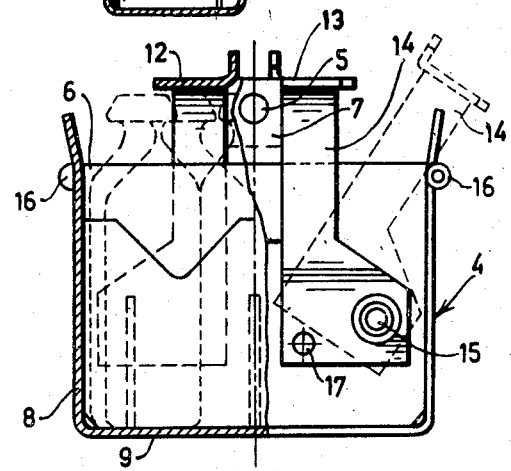
FIG. 2 is a section to a larger scale of a receptacle of a conveyor according to FIG. 1.

FIG. 2 shows in full lines the position of the covering laths 12 and 13 in which they extend over the receptacle 4 in order to prevent the bottles in the receptacle from moving upwards. In this position the connecting plates 14 bear on either side against the supporting arms 7 of the receptacle 4.

The covering laths 12 and 13 can be tilted about the pivots 15 into a position in which they extend near the longitudinal walls 8 to thereby leave the opening of the receptacle 4 clear. This position is represented in FIG. 2 by dot and dash lines and is delimited by the pins 16, which are welded to the corners of the receptacle 4. Since the covering laths 12 and 13 in their two extreme positions are situated entirely sidewards on either side of their pivotal points 15, they are held by the force of gravity in these extreme positions, so that no special locking means are required.

Laterally protruding pins 17 are provided on the connecting plates 14, said pins being capable of cooperation with means disposed along the path of the conveyor and which are formed in such way that due to their action upon the protruding pins 17 the covering laths 12, 13 respectively can be moved from the one extreme position into the other. As a consequence the receptacles can be automatically opened and closed at their loading and discharging station.

While preferred embodiments of the invention have been shown and described, it is to be understood that changes and variations may be made without departing from the spirit and scope of the invention as defined in the appended claims.

What I claim is:

1. A conveyor consisting of a chain and a row of receptacles which are swingably suspended from the links of the chain, each receptacle being capable of accommodating a number of containers, like bottles or jars, fixed confining means interiorly of each receptacle adjacent the containers, and movable confining means above the containers and extending in a longitudinal direction over each receptacle, said movable confining means comprising at least one covering lath, said lath including supporting plates for pivotally connecting said lath with the end faces of the receptacle.

2. A conveyor according to claim 1, in which said lath is movable between two positions on either side of the vertical plane through the pivotal point of the lath, and steps for determining the positions of said lath in such a manner that the lath is maintained in both its end positions through gravity.

3. A conveyor according to claim 2, in which each receptacle is provided with two of said laths, said laths in one of the extreme positions extending adjacent to or against each other in the center portion of the receptacle and in the other extreme position extending near the sidewalls of the receptacle.

4. A conveyor according to claim 3, including sidewise extending projections on said supporting plates located between each said lath and its respective pivot, said sidewise extending projections being capable of cooperation with means extending along the path of the conveyor, and said last-mentioned means being constructed in such a manner that in response to actuation upon the projections, the laths move from their one extreme position into their other extreme position.

5. A conveyor according to claim 1, in which the fixed confining means consist of small strips positioned in at least two planes parallel to the longitudinal sidewalls of the receptacle, the distance between said parallel planes being two to three times as large as the distance from a longitudinal wall to the nearest plane, and the distance between the lateral edges of two adjacent small strips in the same plane being approximately equal to the distance between two adjacent parallel planes.

* * * * *